(12) United States Patent
Campanaro et al.

(10) Patent No.: US 11,919,503 B2
(45) Date of Patent: Mar. 5, 2024

(54) METHODS AND SYSTEM FOR STALL TORQUE DERATING

(71) Applicant: Ford Global Technologies, LLC, Dearborn, MI (US)

(72) Inventors: Justin Campanaro, Ferndale, MI (US); Carol Louise Okubo, Dearborn, MI (US); Jonathan Butcher, Farmington, MI (US); Zachary March, Highlands Ranch, CO (US); Joshua Wilson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 17/654,740

(22) Filed: Mar. 14, 2022

(65) Prior Publication Data
US 2023/0286490 A1   Sep. 14, 2023

(51) Int. Cl.
| | |
|---|---|
| *B60W 20/15* | (2016.01) |
| *B60L 3/06* | (2006.01) |
| *B60W 10/06* | (2006.01) |
| *B60W 10/08* | (2006.01) |
| *B60W 10/18* | (2012.01) |

(52) U.S. Cl.
CPC .............. *B60W 20/15* (2016.01); *B60L 3/06* (2013.01); *B60W 10/06* (2013.01); *B60W 10/08* (2013.01); *B60W 10/18* (2013.01); *B60W 2510/081* (2013.01); *B60W 2510/083* (2013.01)

(58) Field of Classification Search
CPC .. B60W 30/1843; B60W 20/15; B60W 10/06; B60W 10/08; B60W 10/18; B60W 2510/081; B60W 2510/083; B60L 3/06

USPC .......................................................... 701/22
See application file for complete search history.

(56) References Cited

U.S. PATENT DOCUMENTS

| | | | | | |
|---|---|---|---|---|---|
| 4,322,668 | A | * | 3/1982 | Trussler | ................. H02P 7/347 318/434 |
| 4,423,362 | A | * | 12/1983 | Konrad | ................... H02P 7/298 388/903 |
| 5,163,170 | A | * | 11/1992 | Grabowski | ............... B60L 3/00 318/52 |
| 5,630,009 | A | * | 5/1997 | Hayden | ..................... B60S 1/08 388/838 |
| 5,675,464 | A | * | 10/1997 | Makaran | .............. H02K 11/225 361/115 |
| 5,694,011 | A | | 12/1997 | Corey et al. | |
| 5,934,398 | A | * | 8/1999 | Hotta | .................. B60L 15/2009 318/434 |
| 6,339,310 | B1 | * | 1/2002 | Sugiyama | .............. H02H 6/005 388/825 |
| 6,647,325 | B2 | * | 11/2003 | Shimazaki | ............. B60L 50/60 701/22 |
| 9,692,349 | B2 | | 6/2017 | Lee | |

(Continued)

*Primary Examiner* — Sizo B Vilakazi
*Assistant Examiner* — Brian R Kirby
(74) *Attorney, Agent, or Firm* — David Kelley; McCoy Russell LLP

(57) ABSTRACT

Methods and systems are provided for operating a vehicle that includes an electric machine as a propulsion source. In one example, a motor stall assessment level is generated based on an amount of time that the motor is stalled and an amount of torque that is generated by the motor. Mitigating actions may be performed if the motor stall assessment level exceeds a threshold level or value.

20 Claims, 7 Drawing Sheets

(56) References Cited

U.S. PATENT DOCUMENTS

| | | | |
|---|---|---|---|
| 2003/0102659 A1* | 6/2003 | Frank ................... | B60R 22/46 |
| | | | 280/806 |
| 2003/0130772 A1* | 7/2003 | Yanagida ............. | B60L 3/0061 |
| | | | 701/22 |
| 2004/0065490 A1* | 4/2004 | Saito .................... | B60L 3/003 |
| | | | 180/65.23 |
| 2005/0055141 A1* | 3/2005 | Suzuki .................. | B60L 3/06 |
| | | | 701/22 |
| 2009/0021198 A1* | 1/2009 | Okamura .............. | B60L 3/00 |
| | | | 903/902 |
| 2010/0121515 A1* | 5/2010 | Izumi ................... | B60W 10/184 |
| | | | 701/22 |
| 2013/0054062 A1* | 2/2013 | Matsushita .......... | B60W 30/1843 |
| | | | 701/22 |
| 2014/0032029 A1* | 1/2014 | Hirasawa .............. | B60L 7/14 |
| | | | 701/1 |
| 2014/0257610 A1* | 9/2014 | Kimoto ................. | B60L 15/2081 |
| | | | 701/22 |
| 2015/0112535 A1* | 4/2015 | Ota ....................... | B60L 15/36 |
| | | | 701/22 |
| 2015/0274031 A1* | 10/2015 | Okubo ................. | B60L 15/2063 |
| | | | 903/903 |
| 2016/0102622 A1* | 4/2016 | Crombez ............... | G01L 5/22 |
| | | | 701/51 |
| 2018/0079311 A1* | 3/2018 | Ichikawa .............. | B60L 3/12 |
| 2018/0094615 A1* | 4/2018 | Flores-Bamaca ...... | F02N 19/04 |
| 2018/0264948 A1* | 9/2018 | Matsuo ................. | B60L 3/06 |

* cited by examiner

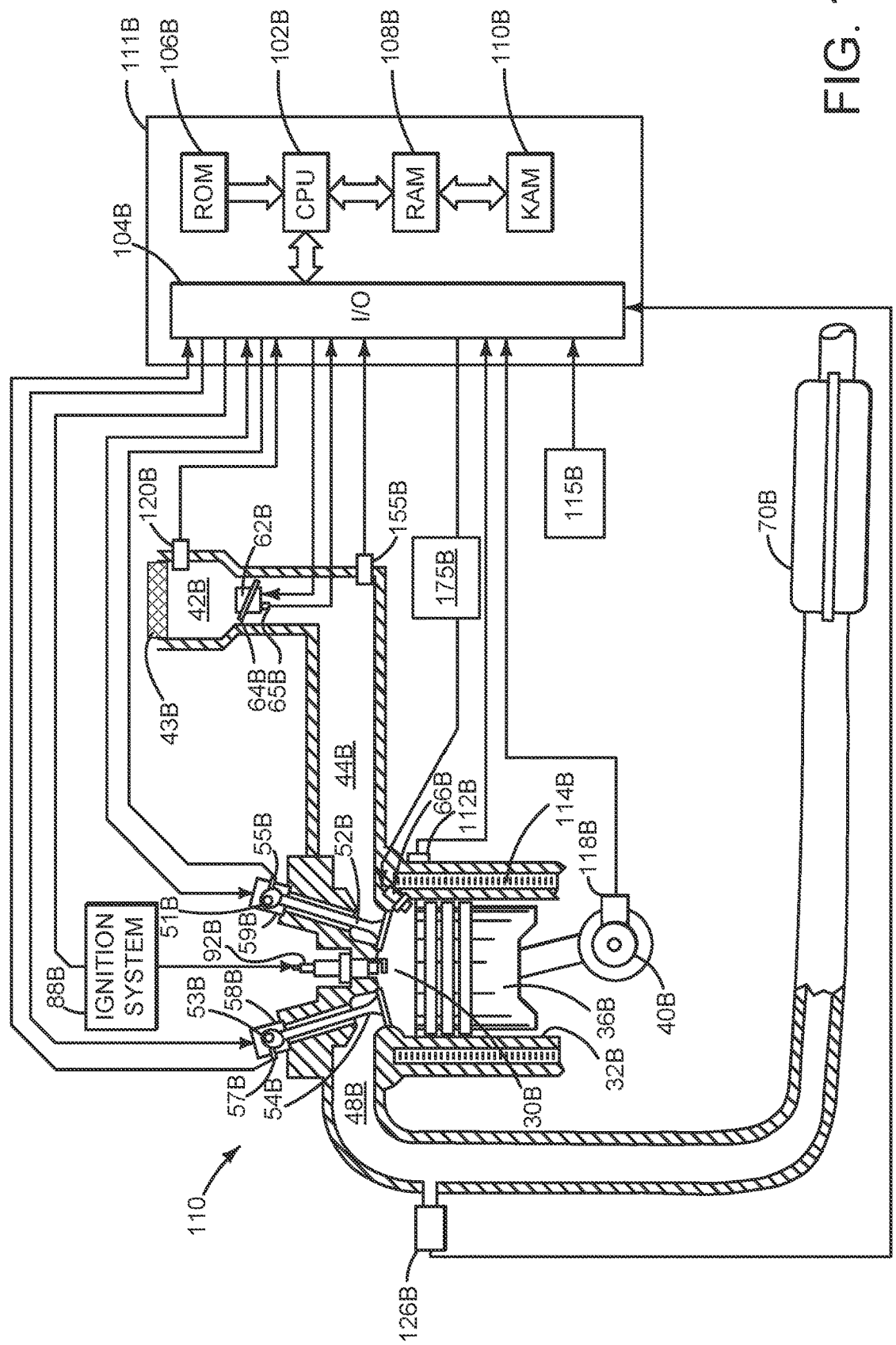

METHODS AND SYSTEM FOR STALL
TORQUE DERATING

FIELD

The present description relates generally to methods and systems for operating an electric propulsion source for an electric or a hybrid vehicle. The methods and systems may be particularly useful for limiting heating of an electric propulsion source.

BACKGROUND/SUMMARY

Electric vehicles and hybrid vehicles may include one or more electric machines that operate as propulsion sources. An electric machine may generate positive torque to propel a vehicle and the electric machine may also operate as a generator to capture a vehicle's kinetic energy when the vehicle is braking. The electric machine may generate heat while it operates and the heat may be carried away via a cooling system. However, there may be instances where windings of the electric machine may generate higher temperatures than may be desired even though the electric machine is being cooled. Therefore, it may be desirable to provide a way of operating an electric machine that reduces a possibility of the electric machine reaching a temperature that may be greater than a desired operating temperature for the electric machine.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B is a sketch of an engine of a hybrid vehicle driveline.

DETAILED DESCRIPTION

Figure 1A:
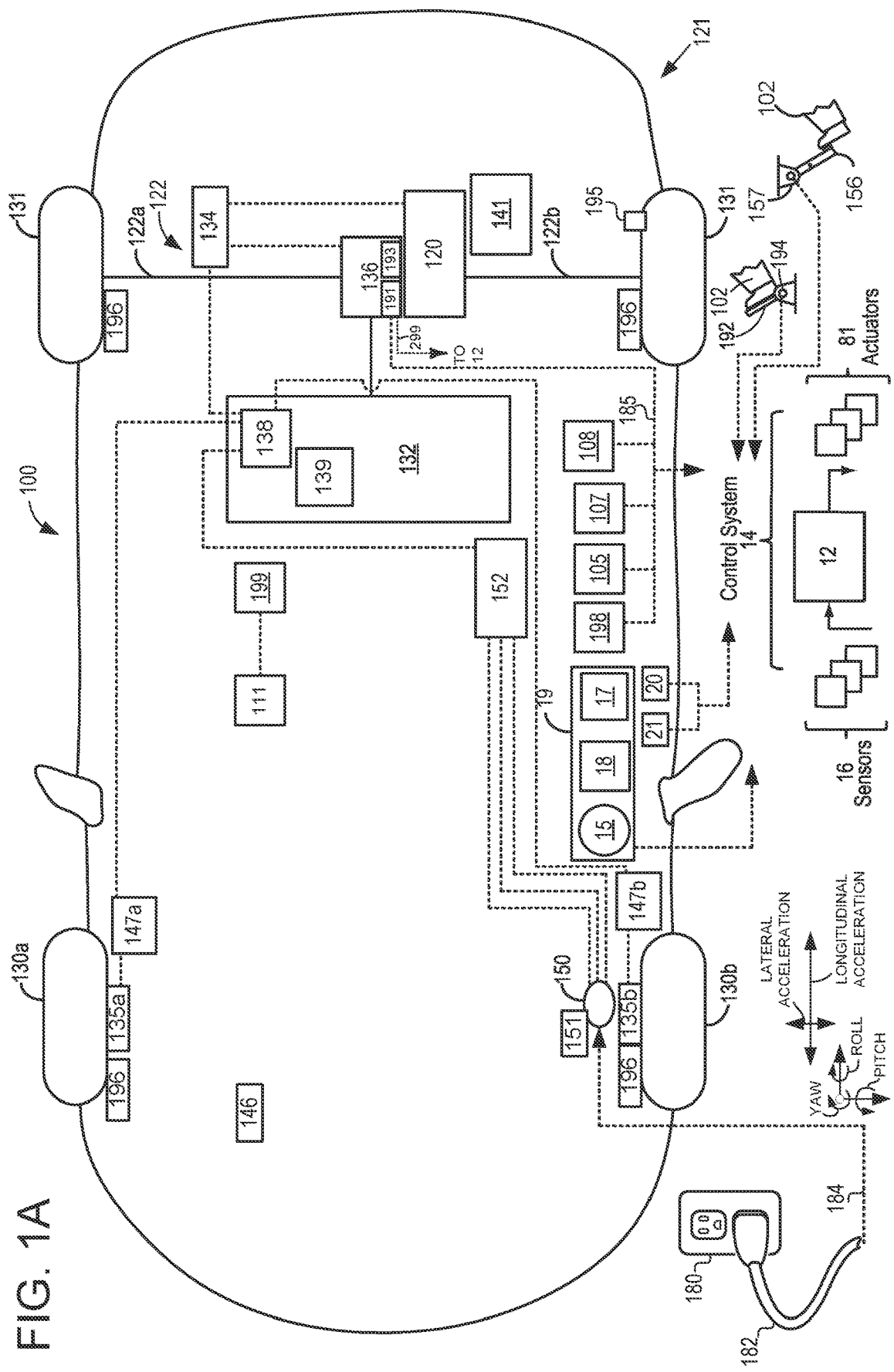
FIG. 1A is a schematic diagram of an electric vehicle driveline.

The following description relates to systems and methods for operating a driveline of a vehicle. FIGS. 1A-3B show example vehicle systems that include one or more electric propulsion sources. The electric propulsion sources may be part of an electric vehicle or a hybrid vehicle. The vehicles may be operated according to the sequence of FIG. 4 and the method of FIG. 5.

A vehicle may include an electric machine as a propulsion source. The electric machine may be a sole propulsion source for the vehicle, or alternatively, it may be included with other propulsion sources including other electric machines and/or internal combustion engines. The electric machine may output a torque in response to a driver demand. In some instances, the driver demand may be adjusted to prevent a vehicle from moving when the vehicle is being acted upon via external forces (e.g., gravity). In addition, during some circumstances, driver demand may exceed a threshold level without the vehicle moving due to the vehicle being constrained by the external environment (e.g., when the vehicle is engaged in rock crawling). The electric machine may enter a stall state where the electric machine's rotor does not turn or where the electric machine's rotor turns at a rotational speed that is lower than a threshold rotational speed (e.g., 1 revolution/minute) and where the electric machine is outputting more than a threshold amount of torque (e.g., more than $\frac{1}{50}^{th}$ of the machine's output torque capacity). During such conditions, temperatures within the electric machine's windings may increase to levels that may be greater than desired when the electric machine is in the stall state for longer than a predetermined amount of time. The higher temperatures may result in degradation within the electric machine. Therefore, it may be desirable to provide a way of determining when temperatures within the electric machine may be approaching undesirable levels so that a possibility of the electric machine degrading may be reduced.

The inventors herein have recognized the above-mentioned issues and have developed a method for operating an electric machine, comprising: via a controller, adjusting a value of a variable as a function of an amount of torque delivered via the electric machine beginning at a most recent time that the electric machine stalled; and performing a mitigating action via an actuator when the value of the variable exceeds a threshold value.

By generating a variable that is a function of an amount of torque that is output by an electric machine and an amount of time that the electric machine has most recently entered a stall state, it may be possible to determine when it may be appropriate to limit torque output of the electric machine. In addition, since the variable compensates for torque output of the electric machine, output of the electric machine may not be needlessly limited when torque output of the electric machine is low, which may be indicative of lower winding temperatures within the electric machine. Accordingly, output of the electric machine may be limited when estimated heat within the electric machine reaches a threshold level, but not before reaching the threshold level, so that degradation of the electric machine may be reduced without operating time being unnecessarily reduced.

The present description may provide several advantages. In particular, the approach may reduce a possibility of electric machine degradation. In addition, the approach may provide a better estimate of when an electric machine may be approaching conditions where degradation of the electric machine may be possible. Further, the approach may provide an array of mitigating actions so that a user vehicle driving experience may be improved.

FIG. 1A illustrates an example vehicle propulsion system 100 for vehicle 121. Vehicle propulsion system 100 includes three propulsion sources, but it may be appreciated that more or fewer propulsion sources may be provided. In this example, vehicle 121 is an electric vehicle that does not include an internal combustion engine.

Vehicle propulsion system 100 includes two independent wheel driving electric machines and a rear axle 122 that includes an electric machine 120. In some examples, rear axle may comprise two half shafts, for example first half shaft 122a, and second half shaft 122b. Vehicle propulsion system 100 further has front wheels 130 and rear wheels 131. In this example, front wheel 130a may be driven via electric machine 135a and front wheel 130b is driven via electric machine 135b. Rear wheels 131 may be driven electric machine 120. The rear axle 122 is coupled to electric machine 120. Rear drive unit 136 may transfer power from electric machine 120 to rear axle 122, resulting in rotation of drive rear wheels 131. Rear drive unit 136 may include a gear set, differential 193, and an electrically controlled differential clutch 191 that adjusts torque transfer to first half shaft 122a and to second half shaft 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to first half shaft 122a and second half shaft 122b may be equal when electrically controlled differential clutch is open. Torque transfer to first half shaft 122a may be different from torque transferred to second half shaft 122b when electrically controlled differential clutch 191 is partially closed (e.g., slipping such that speed input to the clutch is different than speed output of the clutch) or closed.

Electric machine 120 may receive electrical power from onboard electrical energy storage device 132. Furthermore, electric machine 120 may provide a generator function to convert the vehicle's kinetic energy into electrical energy, where the electrical energy may be stored at electric energy storage device 132 for later use by the electric machine 120. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, energy storage device 132, etc. Control system 14 may receive sensory feedback information from one or more of electric machine 120, electric machine 135a, electric machine 135b, inverter system controller 134, inverter system controller 147a, inverter system controller 147b, energy storage device 132, etc. Further, control system 14 may send control signals to one or more of electric machine 120, electric machine 135a, electric machine 135b, inverter system controller 134, inverter system controller 147a, inverter system controller 147b, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with driver demand pedal 192. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle (EV), whereby electrical energy may be supplied to energy storage device 132 from power source 180 via an electrical energy transmission cable 182. During a recharging operation of energy storage device 132 from power source 180, electrical energy transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical energy transmission cable 182 may be disconnected between power source 180 and energy storage device 132. Control system 14 may identify and/or control the amount of electrical energy stored at the energy storage device, which may be referred to as the state of charge (SOC).

In other examples, electrical energy transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it may be appreciated that any suitable approach may be used for recharging energy storage device 132 from a power source that does not comprise part of the vehicle. In this way, electric machine 120 may propel the vehicle.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a sub-system of control system 14. The control system may adjust friction wheel brakes 196 to increase vehicle stability in response to sensor(s) 199. Data from inertial sensor 199 may also be communicated to controller 12, or alternatively, sensors 199 may be electrically coupled to controller 12.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor. Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130a, 131) may maintain tractive contact with the road surface according to driver inputs while braking, which may thus prevent the wheels from locking up, to prevent skidding. In some examples, BSCM may receive input from wheel speed sensors 195.

Figure 1C:
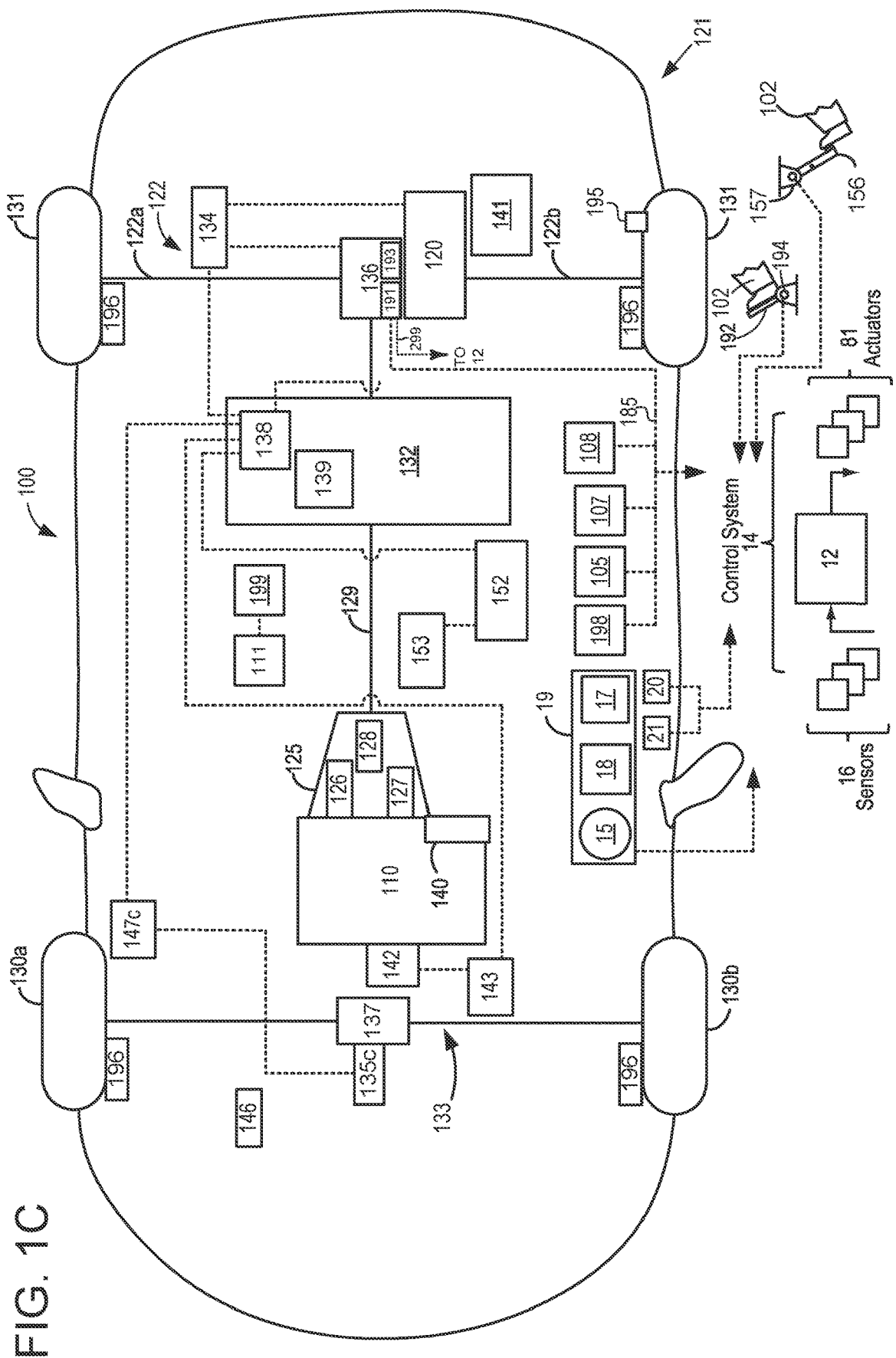
FIG. 1C is a schematic diagram of a hybrid vehicle driveline.

In some examples, vehicle propulsion system 100 may include one or more electric machines 135a and 135b to propel vehicle 121 and to provide regenerative braking via front wheels 130a and 130b. Friction brakes 196 may be applied to slow front wheels 130a and 130b. Second inverter system controller (ISC2) 147a may convert alternating current generated by electric machine 135a to direct current for storage at the electric energy storage device 132 or provide alternating current to electric machine 135a to propel vehicle 121. Likewise, third inverter system controller (ISC3) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with electric machine 120, electric machine 135a, electric machine 135b, etc., may communicate information to controller 12, regarding various states of motor operation.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 120, electric machine 135a, and electric machine 135b) based on an operator input. Various examples of the operator interface 15 may include interfaces that require a physical apparatus, such as an active key, that may be inserted into the operator interface 15 to activate the electric machine 120, electric machine 135a, and electric machine 135b. The key may be removed to shut down the electric machine 120, electric machine 135a, and electric machine 135b and turn off the vehicle. Other examples may include a passive key that is communicatively coupled to the operator interface 15. The passive key may be configured as an electronic key fob or a smart key that does not have to be inserted or removed from the operator interface 15 to operate the vehicle 121. Rather, the passive key may need to be located inside or proximate to the vehicle (e.g., within a threshold distance of the vehicle). Still other examples may additionally or optionally use a start/stop button that is manually pressed by the operator to start or shut down the electric machine 120, electric machine 135a, and electric machine 135b and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into combustion chamber 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and engine air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Catalytic converter 70B can include multiple catalyst bricks, in one example. In another example, multiple emission control devices, each with multiple bricks, can be used. Catalytic converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 155B coupled to intake manifold 44B; an engine position sensor from an engine position sensor 118B sensing crankshaft 40B position; a measurement of air mass entering the engine from sensor 120B; and a measurement of throttle position from sensor 65B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers.

FIG. 1C illustrates an alternative example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with vehicle propulsion system 100 may be referred to as a hybrid electric vehicle (HEV).

Vehicle propulsion system 100 has a front axle 133 and a rear axle 122. In some examples, rear axle may comprise two half shafts, for example first half shaft 122a, and second half shaft 122b. Vehicle propulsion system 100 further has front wheels 130a (right) and 130b (left) and rear wheels 131. In this example, front wheels 130a (right) and 130b (left) may be electrically driven and rear wheels 131 may be driven electrically or via engine 110. The rear axle 122 is coupled to electric machine 120 and to dual clutch transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to rear axle 122, resulting in rotation of drive wheels 131. Rear drive unit 136 may include a gear set, differential 193, and an electrically controlled differential clutch 191 that adjusts torque transfer to first half shaft 122a and to second half shaft 122b.

A transmission 125 is illustrated in FIG. 1C as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131.

Vehicle propulsion system 100 may further include a starter 140. Starter 140 may comprise an electric motor, hydraulic motor, etc., and may be used to rotate engine 110 so as to initiate engine 110 operation under its own power.

In this configuration, the hybrid vehicle driveline includes a front axle 133. Electric machine 135c may provide positive or negative torque to front wheels 130a and 130b via front drive unit 137, which may include a differential. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

Figure 2:
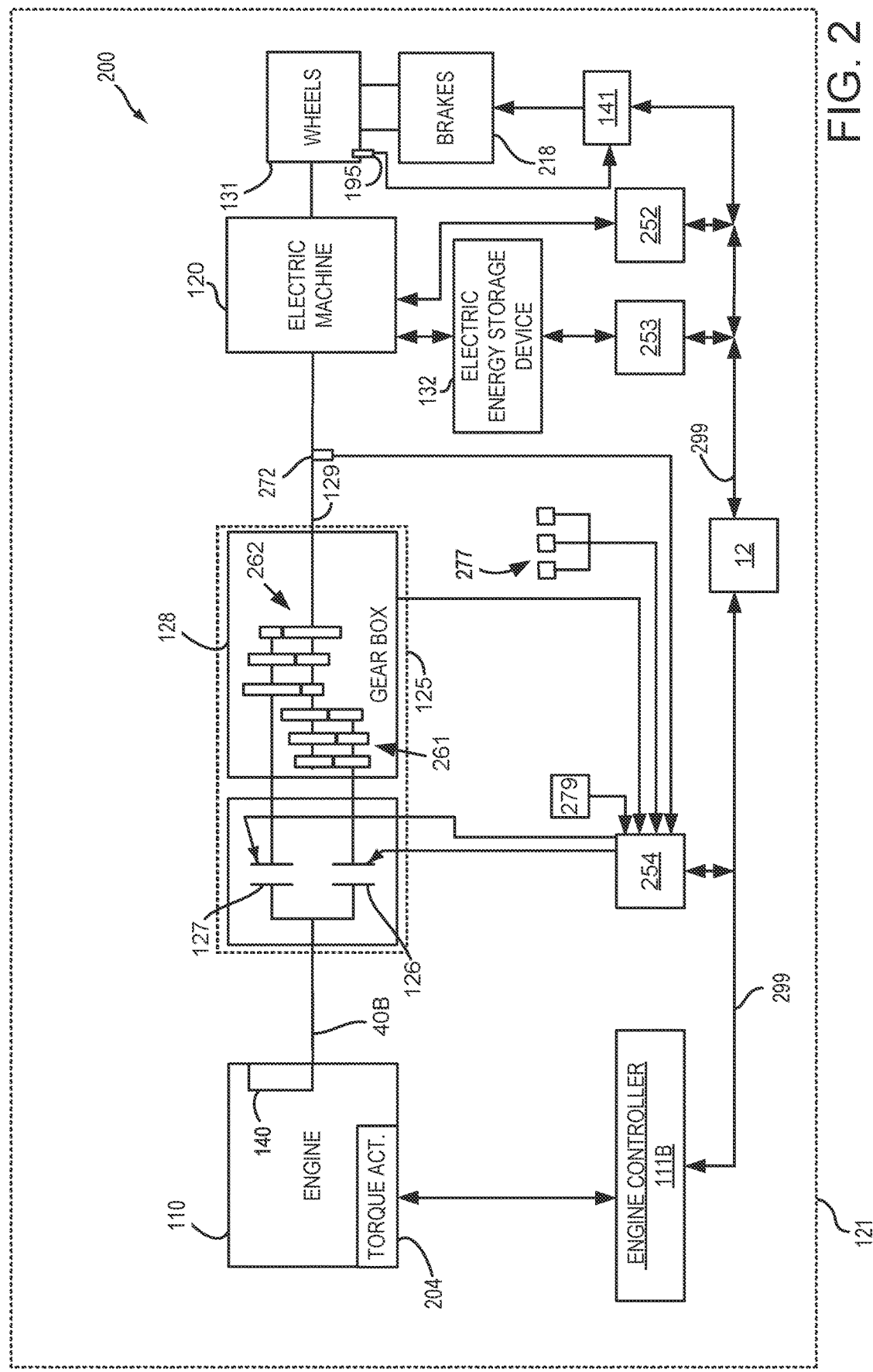
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1B and 1C. Other components of FIG. 2 that are common with FIGS. 1A-1C are indicated by like numerals. Powertrain 200 is shown including vehicle system controller 12, engine controller 111B, electric machine controller 252, transmission controller 254, energy storage device controller 253, and brake system control module 141 (e.g., a brake controller). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake system control module 141 to achieve driver input requests and other requests that are based on vehicle operating conditions.

For example, in response to a driver releasing an a driver demand pedal and vehicle speed decreasing, vehicle system controller 12 may request a desired wheel torque or wheel power level to provide a desired rate of vehicle speed reduction. The desired wheel torque may be provided by vehicle system controller 12 requesting a first braking torque from electric machine controller 252 and a second braking torque from brake system control module 141, the first and second torques providing the brake regulation torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake system control module 141. Alternatively, the vehicle system controller 12 and the engine controller 111B may be a single unit while the electric machine controller 252, the transmission controller 254, and the brake system control module 141 may be standalone controllers.

In this example, powertrain 200 may be powered by engine 110 and electric machine 120. In other examples, engine 110 may be omitted. Engine 110 may be started with an engine starter (e.g. 140) or via electric machine 120. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

Driveline 200 includes engine 110 mechanically coupled to dual clutch transmission (DCT) 125 via crankshaft 40B.

DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1C. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 196. In one example, friction wheel brakes 196 may be engaged in response to the driver pressing their foot on a brake pedal (e.g. 192) and/or in response to instructions within brake system control module 141. Further, brake system control module 141 may apply friction wheel brakes 196 in response to information and/or requests made by vehicle system controller 12. In the same way, a frictional force may be reduced to wheels 131 by disengaging friction wheel brakes 196 in response to the driver releasing their foot from a brake pedal, brake controller instructions, and/or vehicle system controller instructions and/or information. For example, vehicle brakes may apply a frictional force to wheels 131 via brake system control module 141 as part of an automated engine stopping procedure.

Accordingly, torque control of the various powertrain components may be supervised by vehicle system controller 12 with local torque control for the engine 110, transmission 125, electric machine 120, and friction wheel brakes 196 provided via engine controller 111B, electric machine controller 252, transmission controller 254, and brake system control module 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, shift selector position sensors, synchronizer position sensors, and ambient temperature sensors. Transmission controller may also receive a requested transmission state (e.g., requested gear or park mode) from shift selector 279, which may be a lever, switches, or other device.

Brake system control module 141 receives wheel speed information via wheel speed sensor 195 and braking requests from vehicle system controller 12. Brake system control module 141 may also receive brake pedal position information from brake pedal sensor (e.g. 157) shown in FIG. 1A directly or over CAN 299. Brake system control module 141 may provide braking responsive to a wheel torque command from vehicle system controller 12. Brake system control module 141 may also provide anti-lock and vehicle stability braking to improve vehicle braking and stability. As such, brake system control module 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120.

Figure 3A:
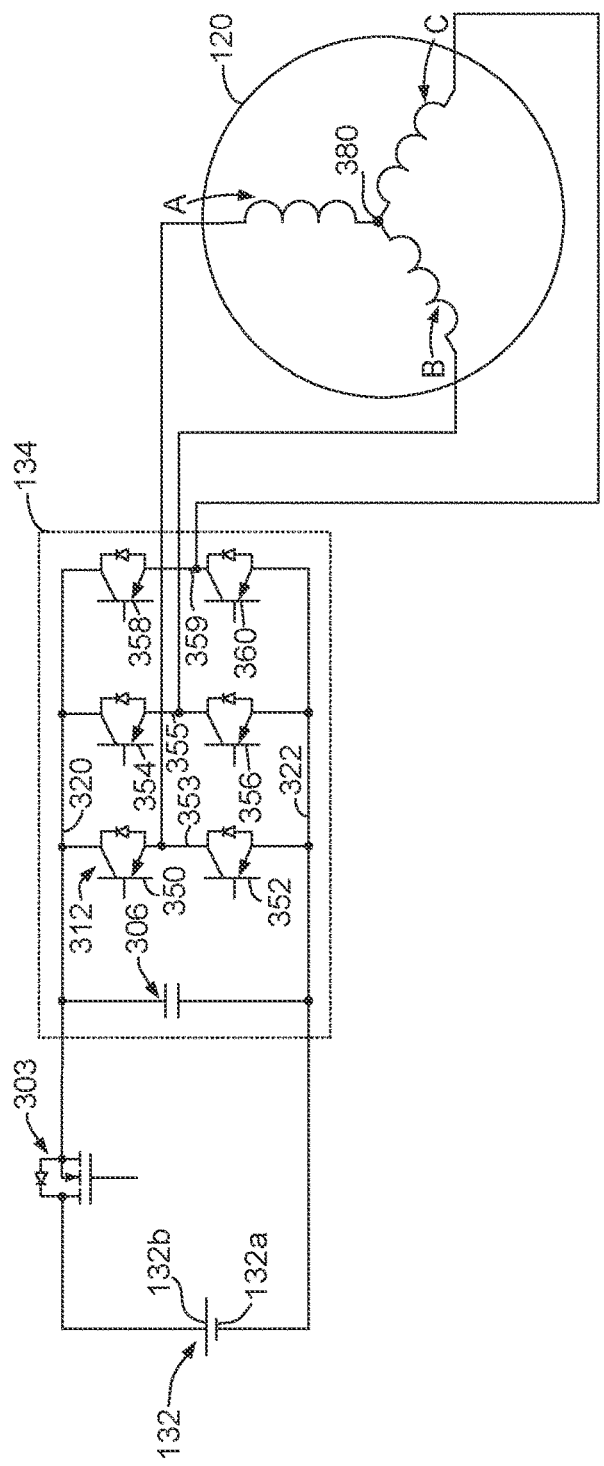
FIG. 3A is a schematic diagram of an inverter and electric machine.

Referring now to FIG. 3A, a schematic view of an electric machine 120 is shown. Electric machine 120 is shown electrically coupled to first inverter system controller 134. First inverter system controller 134 may transform direct current into alternating current. The direct current may be supplied via an electric energy storage device 132. First inverter system controller 134 may supply three phase electric power to electric machine 104 (e.g., an electric motor).

First inverter system controller 134 is shown electrically coupled to positive terminal 132b of electric energy storage device 132 and negative terminal 136a of electric energy storage device 132. Switch or transistor 303 may selectively couple positive electric power rail 320 of first inverter system controller 134 to positive terminal 132b of electric energy storage device 132.

First inverter system controller 134 includes a capacitor 306 to reduce voltage ripple (e.g., changes in voltage level) to a voltage of positive electric power rail 320. First inverter system controller 134 may be comprised of an array of transistors 312 that includes transistors that are electrically coupled in series and transistors that are electrically coupled in parallel. For example, transistor 350 is coupled in series with transistor 352 via conductor 353, and conductor 353 is an output of a first electrical power phase A for first inverter system controller 134. The phase A output is shown coupled to phase winding A of electric machine 120. Transistor 350 is also electrically coupled to positive electric power rail 320 and transistor 352 is electrically coupled to negative voltage rail 322. Transistor 354 is coupled in series with transistor 356 via conductor 355, and conductor 355 is an output of a second electrical power phase B for first inverter system controller 134. The phase B output is shown coupled to phase winding B of electric machine 120. Transistor 354 is also electrically coupled to positive electric power rail 320 and transistor 356 is electrically coupled to negative voltage rail 322. Transistor 358 is coupled in series with transistor 360 via conductor 359, and conductor 359 is an output of a third electrical power phase C for first inverter system controller 134. The phase C output is shown coupled to phase winding C of electric machine 120. Transistor 358 is also electrically coupled to positive electric power rail 320 and transistor 360 is electrically coupled to negative voltage rail 322. The transistors for electric power phases A, B, and C are arranged in parallel.

Electric machine 120 includes windings A, B, and C. Windings A, B, and C are electrically coupled together at node 380 such that windings A, B, and C are arranged in a "Y" configuration. Windings A may receive a first electric power phase from first inverter system controller 134 via conductor 353. Windings B may receive a second electric power phase from first inverter system controller 134 via conductor 355. Windings C may receive a third electric power phase from first inverter system controller 134 via conductor 359.

Electric power phase B supplied from first inverter system controller 134 may be 120 electrical degrees out of phase with electric power phase A. Electric power phase C supplied from first inverter system controller 134 may be 120 electrical degrees out of phase with electric power phase B.

Figure 3B:
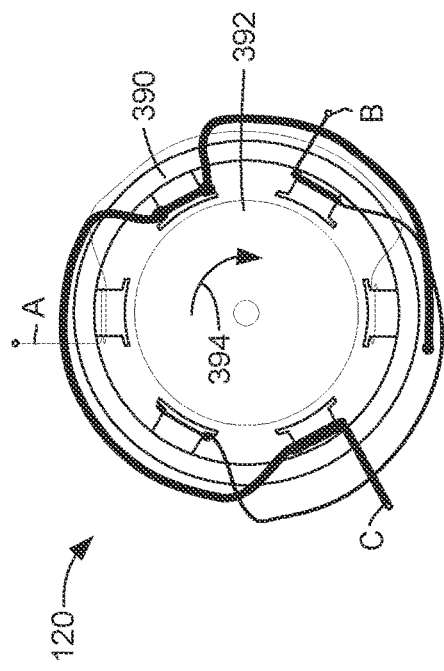
FIG. 3B is a schematic diagram of an electric machine.

Referring now to FIG. 3B, a cut-away of electric machine 120 is shown. Electric machine and other electric machines described herein may be of similar construction. Further, the methods described herein may be applicable to single phase electric machines and electric machine that are configured differently than electric machine 120.

Electric machine 120 is shown with stator 390. Phase windings A, B, and C are shown wrapped around stator 390. Rotor 392 may rotate within stator 390 as indicated by arrow 394 when electric current flows through phase windings A, B, and C.

The system of FIGS. 1A-3B provides for a propulsion system, comprising: an electric machine coupled to a vehicle driveline; and a controller including executable instructions stored in non-transitory memory that cause the controller to reduce an amount of electric current supplied to the electric machine in response to a value of a variable exceeding a threshold value, the variable being a function of an amount of torque delivered via the electric machine beginning at a most recent time that the electric machine stalled. In a first example, the propulsion system includes where the variable represents an amount of a torque adjusted electric machine stall time. In a second example that may include the first example, the propulsion system includes where the variable increases as an amount of electric machine stall time increases. In a third example that may include one or more of the first and second examples, the propulsion system of claim 8, where the amount of electric current supplied to the electric machine is reduced in response to the value of the variable exceeding a threshold level. In a fourth example that may include one or more of the first through third examples, the propulsion system further comprises additional instructions to apply brakes of a vehicle in response to the value of the variable exceeding the threshold value. In a fifth example that may include one or more of the first through fourth examples, the propulsion system further comprises additional instructions to start an engine of a vehicle in response to the value of the variable exceeding the threshold value. In a sixth example that may include one or more of the first through fifth examples, the propulsion system further comprises additional instructions to increase electric current flow to a second electric machine of a vehicle that includes the electric machine in response to the value of the variable exceeding the threshold value. In a seventh example that may include one or more of the first through sixth examples, the propulsion system further comprises additional instructions to reset the value to zero in response to releasing the electric machine from a stall state.

Figure 4:
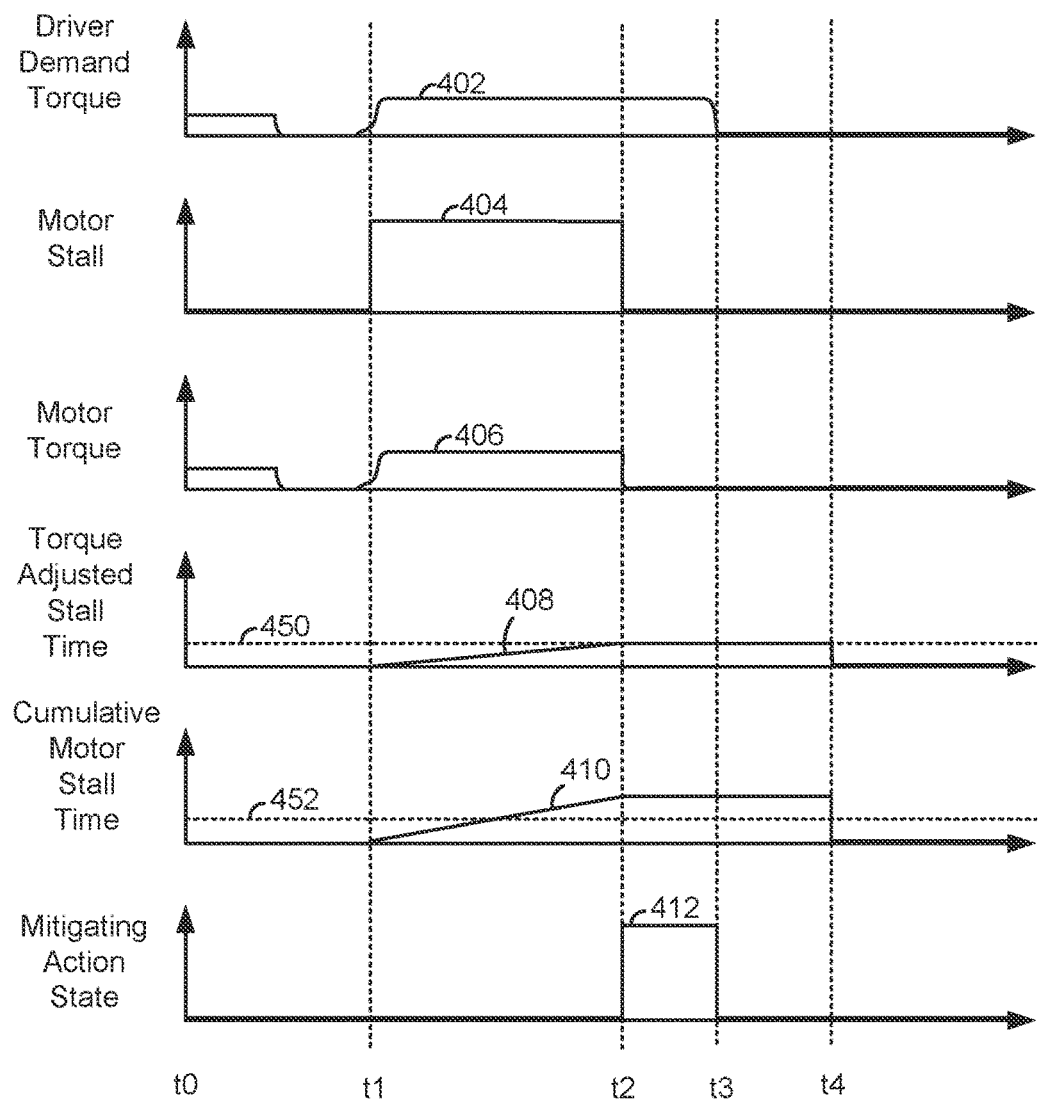
FIG. 4 shows an operating sequence for a vehicle that includes an electric propulsion source.

Referring now to FIG. 4, a prophetic operating sequence according to the method of FIG. is shown. The vehicle operating sequence shown in FIG. 4 may be provided via the method of FIG. 5 in cooperation with the systems shown in FIGS. 1A-3B. The plots shown in FIG. 4 occur at the same time and are aligned in time.

The first plot from the top of FIG. 4 is a plot of driver demand torque versus time. The vertical axis represents an amount of driver demand torque and the driver demand torque increases in the direction of the vertical axis arrow. The driver demand torque is zero at the level of the horizontal axis. The driver demand torque may be determined based on a position of a driver demand pedal. The horizontal axis represents time and time increases from the left side of the figure to the right side of the figure. Trace 402 represents the driver demand torque.

The second plot from the top of FIG. 4 is a plot of a motor stall state versus time. The vertical axis represents the motor stall state and the motor is stalled when trace 404 is at a higher level that is near the vertical axis arrow. The motor is not stalled when trace 404 is near the level of the horizontal axis. The horizontal axis represents time and time increases from the left side of the figure to the right side of the figure. Trace 404 represents the motor stall states state. The motor may enter a stall state or condition when a rotational speed of the motor's rotor is less than a threshold rotational speed while the motor is outputting more than a threshold amount of torque.

The third plot from the top of FIG. 4 is a plot of motor output torque versus time. The vertical axis represents the motor output torque and the motor output torque increases in the direction of the vertical axis arrow. The horizontal axis represents time and time increases from the left side of the figure to the right side of the figure. Trace 406 represents the motor torque output. Motor output torque is zero when trace 406 is at the level of the horizontal axis.

The fourth plot from the top of FIG. 4 is a plot of a torque adjusted motor stall time versus time. The vertical axis represents the torque adjusted motor stall time and the torque adjusted motor stall time increases in the direction of the vertical axis arrow. The torque adjusted motor stall time is equal to zero at the level of the horizontal axis. Trace 408 represents the torque adjusted motor stall time. Horizontal line 450 represents a threshold torque adjusted motor stall time that is not to be exceeded by the torque adjusted motor stall time. The torque adjusted motor stall time is an amount of time that a motor is in a stall state adjusted for the amount of torque that the motor is generating when it is stalled. The torque adjusted motor stall time is not an actual time. Rather, it may be referred to as a numeric value (e.g., a real number) of a variable that is a function of an amount of time that a motor is in a stall state and an amount of torque that is generated by the motor when the motor is in the stall state.

The fifth plot from the top of FIG. 4 is a plot of a cumulative amount of time that a motor is in a stall state versus time. The vertical axis represents the cumulative amount of time that the motor is in the stall state and the cumulative amount of time increases in the direction of the vertical axis arrow. The cumulative amount of time that the motor is in the stall state is zero when trace 410 is at the level of the horizontal axis. The horizontal axis represents time and time increases from the left side of the figure to the right side of the figure. Horizontal line 452 represents a threshold torque adjusted motor stall time that is not to be exceeded by the torque adjusted motor stall time. Thus, horizontal line 452 is the same as horizontal line 450, but it is placed in the fifth plot to show where stall time is relative to threshold 452 and threshold 450.

The sixth plot from the top of FIG. 4 is a plot of a mitigating action state versus time. The vertical axis represents the mitigating action state and mitigating actions may be taken when trace 412 is near the level of the vertical axis arrow. Mitigating actions may not be taken when trace 412 is at a level that is near the horizontal axis. The horizontal axis represents time and time increases from the left side of the figure to the right side of the figure.

At time t0, driver demand torque is at a lower level and the motor has not entered a stalled state. The motor torque follows the driver demand torque and the torque adjusted motor stall time is zero since the motor is not stalled. The cumulative motor stall time is zero since the motor is not stalled. The mitigating action state is not asserted so mitigating actions may not be taken in response to a stalled motor.

Between time t0 and time t1, the driver demand torque is reduced and it is increased shortly before time t1. The motor is not stalled and the motor torque follows the driver demand torque. The torque adjusted motor stall time is zero and the cumulative motor stall time is zero. The mitigating action state is not asserted so mitigating actions may not be taken in response to a stalled motor.

At time t1, the driver demand torque is greater than zero and the motor enters the stall state where the motor's rotor does not turn. This may cause electric current to circulate in windings of only a single motor phase (e.g., phase A) while electric current does not flow in the other winding phases (e.g., B and C). Therefore, the temperature of windings in which electric current flows may increase. The motor stall condition may be a result of the vehicle being on a hill and the driver using motor torque to maintain the vehicle's position. The motor torque follows the driver demand torque and the torque adjusted motor stall time begins to increase. The accumulated motor stall time also begins to increase. The mitigating action state is not asserted.

Between time t1 and time t2, the driver demand has leveled off and it is steady. The motor remains in a stall state and the motor torque is equal to the driver demand torque. The torque adjusted motor stall time is increasing, but it is increasing at a rate that is less than the rate that the cumulative motor stall time is increasing. This is because the motor torque output is only a fraction of the total torque capacity output of the motor. Accordingly, even though the cumulative motor stall time 410 exceeds threshold 452, which is the same as threshold 450, the motor may be permitted to continue delivering torque.

At time t2, the torque adjusted motor stall time exceeds threshold 450 so torque of the motor is reduced and mitigating actions may be taken to maintain the vehicle's position. The mitigating actions may include one or more of applying the vehicle's friction brakes, activating a second electric motor and delivering the driver demand torque via the second electric motor, and starting an engine and delivering the driver demand torque via the engine. The motor exits the stall condition because current is reduced to the motor and the motor no longer generates torque. The torque adjusted motor stall time ceases to increase because the motor is no longer in the stall state. Likewise, the cumulative motor stall time ceases to increase because the motor is no longer in the stall state.

At time t3, the driver demand torque is reduced and the mitigating actions may be withdrawn. The motor is not in a stall state because electric current has been withdrawn from the motor. The motor torque is zero and the torque adjusted motor stall time is limited to a threshold value. The torque adjusted motor stall time and the cumulative motor stall time values are unchanged.

At time t4, a threshold amount of time has passed since the driver demand torque was lowered to zero and the motor exited the stall state. Therefore, the torque adjusted motor stall time is reset to zero as is the motor stall time. Mitigating actions are not being taken because the driver demand is zero.

In this way, a vehicle may reduce a possibility of motor degradation that may be due to a stalled motor. Further, the amount of time that the motor may be stalled may be adjusted according to an amount of torque that the motor is generating while the motor is stalled. In addition, mitigating actions may be taken so that the user's driving experience may be improved.

Figure 5:
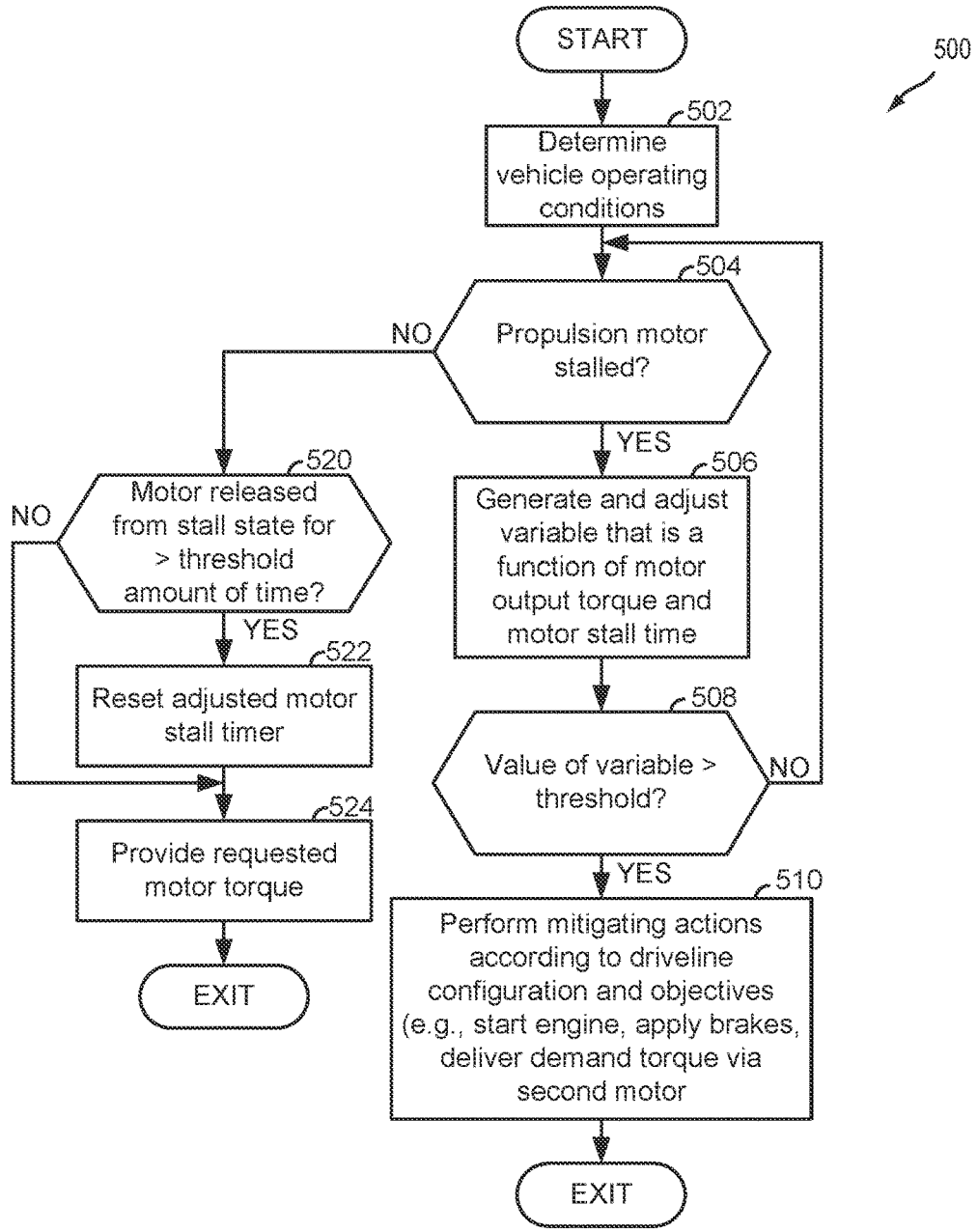
FIG. 5 shows a flowchart of a method for operating a vehicle that includes an electric propulsion source.

Referring now to FIG. 5, an example method for operating a hybrid driveline to improve driveline efficiency via regeneration is shown. The method of FIG. 5 may be incorporated into and may cooperate with the systems of FIGS. 1A-3B. Further, at least portions of the method of FIG. 5 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to driver demand torque, motor speed, vehicle speed, and driver demand pedal position. Method 500 proceeds to 504.

At 504, method 500 judges whether or not a propulsion motor is stalled. A propulsion motor may be determined to be stalled when the rotor of the propulsion motor is rotating at less than a threshold speed (e.g., less than 1 revolution/minute) and output torque of the motor is greater than a threshold torque (e.g., more than 1/50$^{th}$ of the machine's output torque capacity). Additionally, in some examples, method 500 may require that driver demand torque be greater than a threshold torque amount for method 500 to proceed to 506. If method 500 judges that the propulsion motor is stalled, the answer is yes and method 500 proceeds to 506. Otherwise, the answer is no and method 500 proceeds to 520.

At 520, method 500 judges if the motor that was most recently stalled has been released from the most recent stall state for more than a threshold amount of time. If so, the answer is yes and method 500 proceeds to 522. Otherwise, the answer is no and method 500 proceeds to 524. Thus, method 500 may not proceed to 522 unless the motor has been released from the most recent stall state for more than a threshold amount of time so that the motor's windings have time to cool, thereby reducing the possibility of motor degradation.

At 522, method 500 resets the torque adjusted motor stall time to a value of zero. Alternatively, if method 500 is applying a motor stall timer, method 500 resets the value of the motor stall timer to zero. Method 500 proceeds to 524.

At 524, method 500 commands the requested motor torque and the motor outputs the commanded motor torque. The commanded motor torque may be equal to the driver demand torque or a portion of the driver demand torque. Method 500 proceeds to exit.

At 506, method 500 generates a variable that is a function of motor torque output while the motor is in the stall state and an amount of time since the motor most recently entered the stall state. In one example, method 500 may generate a variable that may be referred to as a torque adjusted motor stall time even though the variable does not strictly represent an amount of time that the motor is stalled. The torque adjusted motor stall time may be generated via the following equation:

$$TAMST = TAMST_{old} + T_{inc} \cdot \frac{T_{MS}}{T_{MMax}}$$

where TAMST is the torque adjusted motor stall time, $TAMST_{old}$ is the most recent prior value of TAMST, $T_{inc}$ is the amount of time between TAMST calculation operations, $T_{MS}$ is the torque output of the motor while the motor is presently stalled, and $T_{MMax}$ is the maximum torque output capacity of the motor. The above equation may be applied as soon as the motor enters a stall state and the equation may be applied until the motor exits the stall state. This particular embodiment may calculate the value of TAMAST at predetermined time intervals (e.g., every 50 milliseconds) and the present value of the motor output torque may be applied to determine how much the value of TAMST will increase for the present time interval. Thus, if the output torque of the motor in the stalled state changes, the value of TAMST will be influenced by the change in motor output current.

Alternatively, TAMST may be determined via a timer that accumulates time, but in this example, TAMST may not be as representative of motor operating conditions as the above equation. A timer based value of TAMST may be generated via the following equation:

$$TAMST = TMR \cdot \frac{T_{MS}}{T_{MMax}}$$

where TAMST is the torque adjusted motor stall time, TMR is output of a timer that begins counting a total accumulated amount of time beginning at the most time that the motor entered a stall state after the value of TMR was most recently reset to zero, $T_{MS}$ is the torque output of the motor while the motor is presently stalled, and $T_{MMax}$ is the maximum torque output capacity of the motor. This particular embodiment may calculate the value of TAMAST based on an accumulated amount of time since a motor most recently entered a stall state after the value of TMR was most recently reset to zero and the most recent value of motor torque output while the motor is in the stalled state. Thus, if the output torque of the motor in the stalled state changes, the value of TAMST will be influenced only by the most recent motor output current.

The generated variable may be useful because heat output of the motor scales quadratically with motor current (I) (e.g., $P=I^2 \cdot R$), and motor current I scales linearly with motor output torque. Thus, the generated variable may be indicative of am amount of heat generated via the motor in a stall state and the amount of heat generated may be useful to determine when motor torque may be reduced to reduce a possibility of motor degradation (e.g., reduced effectiveness of motor winding insulation, etc.). Method 500 proceeds to 508.

At 508, method 500 judges if the value of the determined variable (TAMST) is greater than a threshold value. The variable TAMST may be unit less so TAMST may simply be a numeric value. The threshold value may be determined via operating the motor at stall conditions and monitoring motor temperatures at different motor torque output levels. If method 500 judges that the value of the variable is greater than a threshold torque adjusted motor stall time or an accumulated motor stall time, the answer is yes and method 500 proceeds to 510. Otherwise, the answer is no and method 500 returns to 504.

At 510, method 500 performs mitigating actions. Mitigating actions may be determined according to user selections and/or the vehicle's present operating mode. The mitigating actions may include one or more of reducing torque output of the stalled motor (e.g., to zero), applying vehicle friction brakes, starting an internal combustion engine and supplying at least a portion of the driver demand torque via the engine, and activating a second electric motor and supplying at least a portion of the driver demand torque via the second electric motor. For example, method 500 may reduce torque output of electric machine 120 and start engine 110 to deliver driver demand torque in response to electric machine 120 being in a stalled state and the answer of step 508 being yes. In another example, method 500 may reduce torque output of electric machine 120 and activate electric machine 135c to deliver driver demand torque in response to electric machine 120 being in a stalled state and the answer of step 508 being yes. Thus, the position of the vehicle may be maintained when a motor is in a stall state and the value of the above mentioned variable exceeds a threshold value. Method 500 proceeds to exit.

In this way, operation of a vehicle may be adjusted in response to a stalled motor. In addition, the amount of time that the motor may be able to remain in the stalled state may be adjusted as a function of an amount of torque that is delivered by the stalled motor. Consequently, operation of the motor in the stalled state may be based on conditions of the motor that may affect motor temperature and a possibility of motor degradation.

Thus, method 500 provides for a method for operating an electric machine, comprising: via a controller, adjusting a value of a variable as a function of an amount of torque delivered via the electric machine beginning at a most recent time that the electric machine stalled; and performing a mitigating action via an actuator when the value of the variable exceeds a threshold value. In a first example, the method includes where the mitigating action is applying vehicle brakes. In a second example that may include the first example, the method includes where the mitigating action is starting an internal combustion engine. In a third example that may include one or more of the first and second examples, the method includes where the mitigating action is supplying a driver demand torque via a second electric machine. In a fourth example that may include one or more of the first through third examples, the method includes where the variable is a torque adjusted motor stall time. In a fifth example that may include one or more of the first through fourth examples, the method includes where the value of the variable is adjusted when a driver demand torque is greater than a threshold driver demand torque. In a sixth example that may include one or more of the first through fifth examples, the method includes where the most recent time that the electric machine stalled includes a rotor of the electric machine rotating at less than a threshold rotation speed while the electric machine is outputting a torque.

Method 500 also provides for a method for operating an electric machine, comprising: via a controller, adjusting a value of a variable as a function of an amount of torque delivered via the electric machine and an amount of time, the amount of time beginning at a most recent time that the electric machine stalled; and performing a mitigating action via an actuator when the value of the variable exceeds a threshold value. In a first example, the method further comprises resetting the value of the variable to zero in response to the electric machine exiting a stall state. In a second example that may include the first example, the method include where resetting the value of the variable includes resetting the value of the variable a predetermined amount of time after the electric machine exits the stall state. In a third example that may include one or more if the first and second examples, the method includes where the electric machine is stalled when torque output of the electric machine is greater than a threshold torque. In a fourth example that may include one or more of the first through third examples, the method includes where the electric machine is stalled when a rotational speed of the electric machine is less than a threshold rotational speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an electric machine, comprising:
via a controller, adjusting a torque adjusted stall time based on an amount of time between torque adjusted stall time calculations and a ratio of torque output of the electric machine while the electric machine is stalled to a maximum output torque capacity of the electric machine beginning at a most recent time that the electric machine stalled; and
performing a mitigating action via an actuator when the value of the torque adjusted stall time exceeds a threshold value.

2. The method of claim 1, where the mitigating action is applying vehicle brakes.

3. The method of claim 1, where the mitigating action is starting an internal combustion engine.

4. The method of claim 1, where the mitigating action is supplying a driver demand torque via a second electric machine.

5. The method of claim 1, where the adjusting includes multiplying the amount of time between torque adjusted stall time calculations and the ratio of torque output of the electric machine while the electric machine is stalled to the maximum output torque capacity of the electric machine.

6. The method of claim 1, where the value of the variable is adjusted when a driver demand torque is greater than a threshold driver demand torque.

7. The method of claim 1, where the most recent time that the electric machine stalled includes a rotor of the electric machine rotating at less than a threshold rotation speed while the electric machine is outputting a threshold amount of torque.

8. A propulsion system, comprising:
an electric machine coupled to a vehicle driveline; and
a controller including executable instructions stored in non-transitory memory that cause the controller to reduce an amount of electric current supplied to the electric machine in response to a torque adjusted stall time that is based on an amount of time between torque adjusted stall time calculations and a ratio of torque output of the electric machine while the electric machine is stalled to a maximum output torque capacity of the electric machine.

9. The propulsion system of claim 8, where the variable represents an amount of a torque adjusted electric machine stall time.

10. The propulsion system of claim 8, where the variable increases as an amount of electric machine stall time increases.

11. The propulsion system of claim 8, where the amount of electric current supplied to the electric machine is reduced in response to the value of the variable exceeding a threshold level.

12. The propulsion system of claim 8, further comprising additional instructions to apply brakes of a vehicle in response to the value of the variable exceeding the threshold value.

13. The propulsion system of claim 8, further comprising additional instructions to start an engine of a vehicle in response to the value of the variable exceeding the threshold value.

14. The propulsion system of claim 8, further comprising additional instructions to increase electric current flow to a second electric machine of a vehicle that includes the electric machine in response to the value of the variable exceeding the threshold value.

15. The propulsion system of claim 8, further comprising additional instructions to reset the value to zero in response to releasing the electric machine from a stall state.

16. A method for operating an electric machine, comprising:
via a controller, adjusting a value of a variable according to a total accumulated amount of time that begins at a most recent time the electric machine entered a stall state multiplied by a ratio of torque output of the electric machine while the electric machine is in the stall state to a maximum torque output of the electric machine; and
performing a mitigating action via an actuator when the value of the variable exceeds a threshold value.

17. The method of claim 16, further comprising resetting the value of the variable to zero in response to the electric machine exiting a stall state.

18. The method of claim 17, where resetting the value of the variable includes resetting the value of the variable a predetermined amount of time after the electric machine exits the stall state.

19. The method of claim 16, where the electric machine is stalled when torque output of the electric machine is greater than a threshold torque.

20. The method of claim 19, where the electric machine is stalled when a rotational speed of the electric machine is less than a threshold rotational speed.

* * * * *